United States Patent [19]

Efford et al.

[11] Patent Number: 4,547,829
[45] Date of Patent: Oct. 15, 1985

[54] CAPACITOR ASSEMBLY

[75] Inventors: Thomas W. Efford, Knoxville; Joseph A. Moresi, Jr., Oak Ridge, both of Tenn.

[73] Assignee: Sprague Electric Company, North Adams, Mass.

[21] Appl. No.: 615,489

[22] Filed: May 30, 1984

[51] Int. Cl.⁴ .................. H01G 1/14; H01G 9/00
[52] U.S. Cl. .................................. 361/306; 361/433
[58] Field of Search ............... 361/303, 306, 308, 433

[56] References Cited
U.S. PATENT DOCUMENTS 3,452,257 6/1969 Belko ........................... 361/308
4,141,070 2/1979 Bowling ......................... 361/433
4,447,852 5/1984 Clement ........................ 361/306

Primary Examiner—Donald A. Griffin

[57] ABSTRACT

A capacitor assembly has a wound and flattened non-extended foil capacitor section with at least one electrode tab connected to each electrode and is enclosed in a case having an insulating cover and an insulating base. Conductive members are secured to said base by conductive means which extend through the members and the base; one end of each conductive means is covered by a folded portion of the conductive member and welded. The electrode tabs are attached by welding to a side portion of the conductive member.

8 Claims, 2 Drawing Figures

U.S. Patent    Oct. 15, 1985    4,547,829
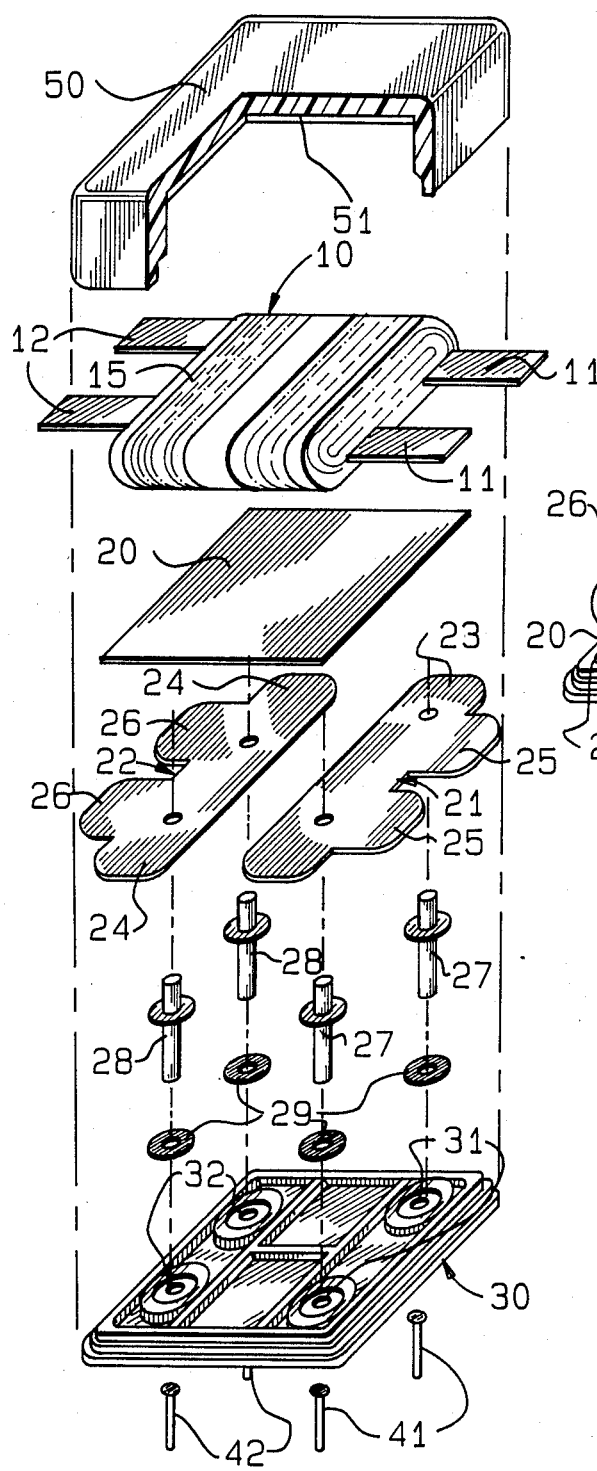
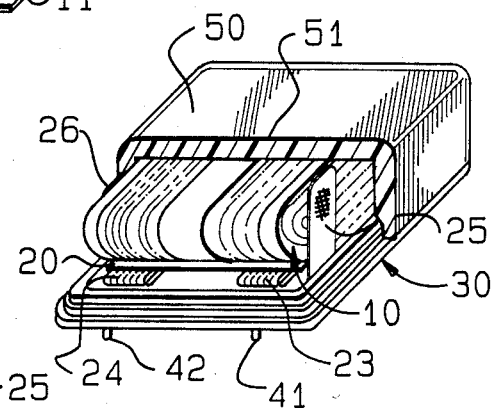

CAPACITOR ASSEMBLY

BACKGROUND OF THE INVENTION

This invention concerns a capacitor assembly in which a wound and flattened non-extended foil capacitor section is enclosed in a case having an insulating cover and an insulating base. Conductive members are secured to the base by conductive means which extend through the members and the base with an end of the means being covered by and welded to a folded portion of the member. At least one electrode tab is connected to each electrode, and each tab is connected to a side portion of a conductive member. External leads may be attached to the second end of the conductive means.

The capacitor of the present invention can be used where low-inductance units are required and as a filter capacitor. Filter capacitors of various designs are well-known and have been used to smooth rectified alternating current to minimize output ripple voltage. They have also been used in switching power supplies to remove transient currents when the load changes.

A very low-inductance unit adaptable for use as a filter capacitor is described by Warren J. Clement in U.S. Ser. No. 387,739, filed June 14, 1982, now U.S. Pat. No. 4,447,852, issued May 8, 1984. It features a wound and flattened extended-foil section in which the extended foil edges are edge-connected to each other and are connected to a clamping bus strip. The resulting unit has extremely low-inductance.

There is a need, however, for a capacitor of the same size with less stringent inductance requirements and, particularly, for one which can be manufactured economically in large volume. It is to serve this market that the capacitor of the present invention was designed.

SUMMARY OF THE INVENTION

A capacitor assembly has a wound and flattened non-extended foil capacitor section with one or more electrode tabs connected to each electrode. It is enclosed in a case having an insulating cover portion and an insulating base portion. A pair of conductive members or terminal strips, each having end portions, preferably rounded, and one or more side portions, also preferably rounded, are secured to the base by conductive means which pass through the member and the base. Each end portion is folded over and welded to the end of each conductive means which passes through the body of the member and the base. An electrode tab is connected to each side piece which is preferably bent vertically holding the section in place. The capacitor section may be impregnated with electrolyte, and the cover subsequently sealed to the base. External terminations such as leads may be attached to the external ends of the conductive means.

BRIEF DESCRIPTION OF THE DRAWINGS

FIG. 1 is an expanded perspective view of the capacitor of the present invention.

FIG. 2 is a partially cut-away perspective view of a second embodiment as a finished capacitor.

DESCRIPTION OF THE PREFERRED EMBODIMENTS

In the embodiment shown in FIG. 1, capacitor section 10 is wound and flattened in a usual manner with a pair of electrode tabs 11 attached to the anode foil and a pair of electrode tabs 12 attached to cathode foil during winding, with interleaved spacer material 15, preferably paper, separating the foil electrodes which are preferably aluminum foils.

Conductive means 27 and 28, preferably aluminum, are assembled with gaskets 29 and attached to base 30 through holes 31 and 32 and secured by upsetting the long shank ends of means 27 and 28 by conventional techniques. The conductive members 21 and 22 are then assembled to conductive means 27 and 28 by passing the short shank portion through the respective holes of conducting members 21 and 22 and secured by upsetting means 27 and 28 by conventional techniques. The ends of conducting members 21 and 22 are folded over the upset ends of conducting means 27 and 28 respectively and secured by welding. These ends of members 21 and 22 are preferably rounded as shown to remove sharp corners.

Side portions 25, 26 of conductive members 21, 22 are bent toward the vertical and section 10 is placed on conductive member 21, 22 with insulating spacer 20 placed between section 10 and conductive members 21, 22. Tabs 11 are connected to respective side portions 25, and tabs 12 connected in like manner to side portions 26. Side portions 25, 26 with connected tabs 11, 12 are bent to the vertical holding section 10 in place. Again, these side portions are shown as the preferred embodiment with rounded edges similar to the end portions 23 and 24 although either or both could be rectangular in shape. It is preferred that these side portions are in the form of rounded ears as shown as an ear gives a definite site for electrode tab attachment, and the ears are easier to bend vertically than a solid piece would be.

Section 10 is impregnated with an electrolyte, and upper case 50 is sealed to base 30. Alternately, the case may be sealed and the section subsequently impregnated with an electrolyte through a fill hole (not shown) that is then sealed with plastic.

If desired, external leads 41, 42 are attached to the exterior ends of conductive means 27, 28, respectively, or these ends may be terminated in other fashions to facilitate other mounting techniques.

As shown in FIG. 2, capacitor section 10 is located between strips 21, 22. However, there is only a single electrode tab connected to each electrode and to a respective side portion 25 or 26, preferably by welding. These side portions could also extend longitudinally along the sides of section 10 if more support for the section is needed. It is preferred to use the eared version, however, for ease of tab attachment and bending. Section 10 lies on insulating spacer 20 which also serves to prevent the puncturing or ripping of section outerwrap 15 by folded ends 23, 24. Section 10 is impregnated by electrolyte (not shown) and cover 50 is sealed to base 30, preferably by ultrasonic welding.

The present capacitor is simpler and more economical to manufacture than prior art devices. It utilizes a conventional, non-extended foil winding, that uses significantly less electrode material, can be wound at higher speeds than an extended foil winding, and allows electrode tabs to be attached automatically at winding. The capacitor is preferably a wound and flattened aluminum foil section, and the conducting members are made of aluminum flat stock and can be stamped out economically. The base and conducting members can be preassembled through the upsetting of the conducting means. The flattened section is then inserted, the tabs connected to the side portions which are bent vertically, and the cover affixed. The unit may be impregnated with electrolyte before or after the case is sealed, and if desired, external leads attached. Much of the assembly can be done automatically and in fewer steps than are required for prior art devices.

What is claimed is:

1. A capacitor assembly comprising a wound and flattened, non-extended foil capacitor section having at least one electrode tab connected to one electrode extending from one side of said section and another tab connected to another electrode extending from an opposite side of said section, a capacitor case having an insulating cover and an insulating base, a pair of conductive members each having at least one hole therein, conductive means passing through said hole and said base securing said members to said base, said conductive members each having end portions and side portions, said end portions being folded over and connected to an end of said conductive means, each side portion being connected to one of said electrode tabs, said cover enclosing said section and being sealed to said base.

2. A capacitor according to claim 1 wherein there is an insulating spacer positioned between said folded-over ends and said section.

3. A capacitor according to claim 1 wherein each conductive means bears a gasket located between said conductive means and said base.

4. A capacitor according to claim 3 wherein said conductive means are tubular inserts.

5. A capacitor according to claim 3 wherein said section is impregnated with electrolyte.

6. A capacitor according to claim 1 wherein external terminations are connected to a second end of said conductive means.

7. A capacitor according to claim 1 wherein said side portions extend vertically from said conductive members and each press against a side of said section holding it in place.

8. A capacitor according to claim 1 wherein edges of said end portions and said side portions are rounded.

* * * * *